United States Patent
Linder et al.

(10) Patent No.: US 12,312,553 B2
(45) Date of Patent: May 27, 2025

(54) SYNTHETIC ELECTROSURGICAL LUBRICANTS, KITS AND METHODS REGARDING THE SAME

(71) Applicant: KVI LLC, Eden Prairie, MN (US)

(72) Inventors: Jessica Sue Haney Boester Linder, Belleville, IL (US); Zachary Lincoln Strittmatter, Ballwin, MO (US)

(73) Assignee: KVI LLC, Eden Prairie, MN (US)

( * ) Notice: Subject to any disclaimer, the term of this patent is extended or adjusted under 35 U.S.C. 154(b) by 0 days.

(21) Appl. No.: 18/494,192

(22) Filed: Oct. 25, 2023

(65) Prior Publication Data
US 2024/0166967 A1     May 23, 2024

Related U.S. Application Data

(60) Provisional application No. 63/422,687, filed on Nov. 4, 2022.

(51) Int. Cl.
*C10M 129/56*     (2006.01)
*C10M 171/02*     (2006.01)

(52) U.S. Cl.
CPC ........ *C10M 129/56* (2013.01); *C10M 171/02* (2013.01)

(58) Field of Classification Search
CPC .............. C10M 129/56; C10M 171/02; C10M 107/32; C10M 2209/1023; C10M 2209/1105; C08G 63/20; C10N 2020/02; C10N 2020/04; C10N 2030/02; C10N 2030/16; C10N 2040/06; C10N 2040/50
See application file for complete search history.

(56) References Cited

U.S. PATENT DOCUMENTS

| | | | |
|---|---|---|---|
| 7,217,270 B2 | 5/2007 | Clement et al. | |
| 7,317,068 B2 | 1/2008 | Burgo | |
| 9,359,524 B2* | 6/2016 | Breon | ................ C08G 18/4219 |
| 10,508,248 B2 | 12/2019 | Housel et al. | |
| 11,198,831 B2 | 12/2021 | Barker et al. | |
| 2010/0272660 A1 | 10/2010 | Malle | |
| 2015/0105518 A1* | 4/2015 | Maksimovic | ........ C08G 63/127 |
| | | | 524/601 |
| 2019/0337878 A1 | 11/2019 | Barker et al. | |

OTHER PUBLICATIONS www.antonpaar.com Viscosity of Lubricating Oil (Year: 0000).*

* cited by examiner

*Primary Examiner* — Cephia D Toomer
(74) *Attorney, Agent, or Firm* — Hudak, Shunk & Farine Co. LPA

(57) ABSTRACT

Electrosurgical lubricants, sterilized kits including the lubricants, methods for using the lubricants, and methods for preparing sterilized kits having the lubricants therein. Electrosurgical devices utilize a high frequency electrical current to cut and to coagulate tissue during surgery. A problem of the electrosurgical devices is that the heat thereof causes tissue, such as that of a human being, to remain on the device and is generally difficult to remove, even with repeated washings. The electrosurgical lubricants have been found to considerably reduce the amount of eschar that builds up on electrosurgical devices, decrease the tendency of electrodes to stick to tissues at the surgical site, and prevent damage to the surface of the electrosurgical device.

20 Claims, 2 Drawing Sheets

| Blade Condition | Eschar build up on the blades After 4 burns of a chicken substrate | Eschar remaining on the blades After 5 wipes with a dry Kim wipe |
|---|---|---|
| Uncoated | | |
| Soy Lecithin | | |
| Example electrosurgical lubricant compositions | | |

FIG. 1

Control (no product)  Soy Lecithin  Example electrosurgical lubricant composition

SYNTHETIC ELECTROSURGICAL LUBRICANTS, KITS AND METHODS REGARDING THE SAME

FIELD OF THE INVENTION

The present invention relates to electrosurgical lubricants, sterilized kits including the lubricants, methods for using the lubricants, and methods for preparing sterilized kits having the lubricants therein. Electrosurgical devices utilize a high frequency electrical current to cut and to coagulate tissue during surgery. A problem of the electrosurgical devices is that the heat thereof causes tissue, such as that of a human being, to remain on the device and is generally difficult to remove, even with repeated washings. The electrosurgical lubricants of the present invention have been found to considerably reduce the amount of eschar that builds up on electrosurgical devices, decrease the tendency of electrodes to stick to tissues at the surgical site, and prevent damage to the surface of the electrosurgical device.

BACKGROUND OF THE INVENTION

Electrosurgical lubricants are used during surgery in conjunction with electrosurgical devices in an effort to reduce sticking of electrodes to tissue, which can cause tears when the electrode is removed, leading to bleeding and damage to the surgical site.

An example of an electrosurgical lubricant is a phospholipid lubricant such as soy lecithin. While soy lecithin is a suitable lubricant, the lubricants of the present invention have all the advantages of soy lecithin plus a higher flashpoint, higher heat stability, protection of the surface of the electrosurgical device, and the like. Moreover, even though soy lecithin reduces the ability of an electrode of an electrosurgical tool to stick to tissue, it has only fair stability to irradiation and is an amphiphilic compound.

U.S. Pat. No. 7,217,270 granted May 15, 2007 relates to a coating for use in lubricating an electro-cautery probe of a cauterization device to reportedly resist sticking of tissue on the electro-cautery probe. The coating can lubricate other medical instruments as well as to facilitate sliding of one instrument against another. The coating includes an amphiphilic lipid and also an amphiphilic phospholipid, a glycerol-based lipid, a glycerol-based phospholipid, and/or a lecithin.

U.S. Pat. No. 7,317,068, granted Jan. 8, 2008 relates to polyol polyester polymers which are reportedly useful for personal care formulations and products containing such formulations that are used or marketed as a material to be applied to the skin, hair, nails and/or the stratum corneum of human or animal subjects. The polyol polyester polymers include a reaction product of at least one polyfunctional alcohol, at least one polyfunctional carboxylic acid, and at least one monofunctional carboxylic acid, wherein the polyfunctional alcohol includes about two to about ten carbon atoms, the polyfunctional carboxylic acid includes one to about thirty-six carbon atoms, and the monofunctional carboxylic acid includes about four to about twenty-four carbon atoms. Such polyol polyester polymers can have a dynamic viscosity at 25° C. of about 200 to about 5000 centipoises and a hydroxyl value of about 40 to about 300 KOH/g.

U.S. Pat. No. 10,508,248 granted Dec. 17, 2019 relates to a lubricant composition for metal working that reportedly has reduced deposit formation and a low evaporation allowing for improved performance in high temperature applications relative to conventional high temperature lubricants. The high temperature lubricant composition includes a base oil, wherein the base oil includes at least one polyol ester and at least one pyromellitate ester. In some embodiments, the lubricant composition further includes one or more additives selected from the group of an extreme-pressure additive, an anti-wear additive, an anti-rust additive, a corrosion inhibitor, and an antioxidant, or a combination thereof. Further provided are methods for lubricating an apparatus using the lubricant composition, methods for improving the operational lubrication of a conventional high temperature lubricant, and methods of preparing the high temperature lubricant composition.

U.S. Pat. No. 11,198,831 granted Dec. 14, 2021 relates to a lubricant for a medical device and includes a first non-amphiphilic triglyceride. The lubricant further includes a second non-amphiphilic triglyceride that is different from the first non-amphiphilic triglyceride. The lubricant further includes a non-amphiphilic glycol ester.

In view of the above, the art still needs lubricants for electrosurgical devices that provide improvements over the state of the art.

SUMMARY OF THE INVENTION

The present invention relates to synthetic lubricant compositions for coating electrosurgical devices that are used during surgical procedures. The lubricant reduces the amount of eschar that builds up on electrosurgical devices during surgical use, decreases the tendency of electrodes to stick to tissues at the surgical site, and prevents or reduces damage to the surface of the electrosurgical device. Other advantages include that the lubricant is non-cytotoxic, is more easily cleaned from devices than soy lecithin, has a high viscosity that allows it to evenly coat the electrosurgical devices, and maintains its viscosity even when exposed to terminal irradiation. The lubricant also has superior high heat stability and an elevated flashpoint of at least about 550° F. (288° C.). The lubricant is also free of proteins that could potentially cause allergic reactions. Additionally, the lubricant has a low odor profile even after aging.

In one embodiment, the electrosurgical lubricants of the invention comprise a polymer derived from a reaction product of a) at least one monofunctional carboxylic acid, b) a polyfunctional carboxylic acid and c) at least one polyfunctional alcohol, wherein the lubricant has a viscosity above 5,000 centipoises (5 Pa·s), desirably at least 6,000 centipoises (6 Pa·s), and preferably at least about 8,000 centipoises (8 Pa·s) up to about 15,000 centipoises (15 Pa·s) at 25° C. as measured according to ASTM D7042. Advantageously, the relatively high viscosity permits substantially even coating of the electrosurgical device and allows the lubricant to maintain contact with the device prior to use without appreciable dripping or otherwise running off of the device, due at least in part to the cohesiveness of the lubricant composition provided by the high viscosity.

In still a further embodiment, the monofunctional carboxylic acid has from about 4 to about 24 carbon atoms, the polyfunctional carboxylic acid has 2 to about 12 carbon atoms, and the polyfunctional alcohol has 2 to about 10 carbon atoms.

In another embodiment, the monofunctional carboxylic acid is one or more of 2-methylpropanoic acid, benzoic acid, 2-ethylbuteric acid, hexanoic acid, heptanoic acid, 2-ethylhexanoic acid, octanoic acid, nonanoic acid, 3,5,5-trimethylhexanoic acid, isononanoic acid, decanoic acid, isooctadecanoic acid, dodecanoic acid, 2-methyl butyric acid, isopentanoic acid, pentanoic acid, 2-methyl pentanoic acid, 2-methyl hexanoic acid, isooctanoic acid, undecylinic acid, isolauric acid, isopalmitic acid, isostearic acid, and behenic acid, or a derivative thereof; the polyfunctional carboxylic acid is one or more of butanedioic acid, pentanedioic acid, hexanedioic acid, heptanedioic acid, octanedioic acid, nonanedioic acid, decanedioic acid, undecanedioic acid, dodecanedioic acid, carbonic acid, dimer acid, phthalic acid, isophthalic acid, terephthalic acid, and 2-6-naphthalene dicarboxylic acid, or a derivative thereof; and the polyfunctional alcohol is one or more of glycerol, pentaerythritol, dipentaerythrityl, tripentaerythritol, trimethylolpropane, neopentyl glycol, propylene glycol, 1,3-butylene glycol, 2-methyl-1,3-propanediol, dipropylene glycol, ethylene glycol, cyclohexanedimethanol, and butyl ethyl propanediol, or a derivative thereof.

In another embodiment, the monofunctional carboxylic acid comprises isooctodecanoic acid, the polyfunctional carboxylic acid comprises hexanedioic acid, and the polyfunctional alcohol comprises propanediol.

In a further embodiment, the composition includes one or more of a viscosity modifier, a surfactant, an antioxidant, a pigment, a dye, a preservative, a non-stick component, a fragrance, a scented component and an anti-inflammatory.

In a still further embodiment, the viscosity ranges from 6,000 centipoises (6 Pa·s) to 12,000 centipoises (12 Pa·s) as measured according to ASTM D7042.

In a further embodiment, the viscosity ranges from 8,000 centipoises (6 Pa·s) to 11,000 (11 Pa·s) centipoises as measured according to ASTM D7042.

In still a further embodiment, the lubricant has a flash point greater than 175° C., the electrosurgical lubricant is free of proteins, and wherein the electrosurgical lubricant is sterile.

In a further embodiment, the polymer has a multimodal distribution with a first distribution peak comprising 5 to 20 percent of the total weight of the polymer and a weight average molecular weight from 25,000 to 400,000, a second distribution peak comprising 55 to 60 percent of the total weight of the polymer and a weight average molecular weight from 2,000 to 40,000, a third distribution peak comprising 3 to 18 percent of the total weight of the polymer and a weight average molecular weight from 500 to 7,000, a fourth distribution peak comprising 9 to 24 percent of the total weight of the polymer and a weight average molecular weight from 100 to 7,000 and a fifth distribution peak comprising 1 to 16 percent of the total weight of the polymer and a weight average molecular weight from 50 to 1,000.

In yet a further embodiment, a method for lubricating an electrosurgical device is disclosed, comprising the steps of obtaining the electrosurgical device; and applying a lubricant comprising a reaction product of a) at least one monofunctional carboxylic acid, b) a polyfunctional carboxylic acid and c) at least one polyfunctional alcohol, wherein the lubricant has a viscosity above 5,000 centipoises (5 Pa·s), desirably at least 6,000 centipoises (6 Pa·s), and preferably at least about 8,000 centipoises (8 Pa·s) up to about 15,000 centipoises (15 Pa·s) at 25° C. as measured according to ASTM D7042. Additionally, the lubricant has a rheology that prevents "stringing" of the lubricant during application which reduces the mess associated with coating the device.

In a further embodiment, a method for lubricating an electrosurgical device is disclosed, comprising the steps of: obtaining the electrosurgical device; and applying the electrosurgical lubricant described herein to the at least a portion of the electrosurgical device.

In a still further embodiment, a kit for lubricating electrosurgical tools is disclosed, comprising: a sealed package, comprising therein: a sealed container including an electrosurgical lubricant comprising: a polymer derived from a reaction product of at least one monofunctional carboxylic acid, at least one polyfunctional carboxylic acid and at least one polyfunctional alcohol, wherein the lubricant has a viscosity above 5,000 centipoises (5 Pa·s) to about 15,000 centipoises (15 Pa·s) at 25° C. as measured according to ASTM D7042; and an applicator that can be utilized to apply the electrosurgical lubricant to an electrosurgical tool, wherein the sealed container, electrosurgical lubricant and applicator are sterile.

In an additional embodiment, the sealed container includes a jar, a bottle, a tube, a bag, a pouch, a vial, or a flask, and the applicator is one or more of a sponge, wipe, brush and cloth.

In a still further embodiment, the sterilization is provided by subjecting the sealed package to a radiation dose between 20 and 55 kGy.

In a further embodiment, a method for preparing a kit for lubricating electrosurgical tools is disclosed, comprising the steps of: adding the electrosurgical lubricant to a container; sealing the container; placing the sealed container and an applicator in a package; sealing the package with the sealed container and applicator therein; and subjecting the sealed package to doses of radiation between 20 and 55 kGy thereby sterilizing the sealed package, the sealed container with electrosurgical lubricant therein, and the applicator.

In another embodiment, the sealed package is subjected to gamma rays or x-rays.

BRIEF DESCRIPTION OF THE DRAWINGS

The invention will be better understood and other features and advantages will become apparent by reading the detailed description of the invention, taken together with the drawings, wherein:

FIG. 1 is a chart including photographs showing test results from an eschar test on electrosurgical blades that are uncoated, soy lecithin coated or coated with an electrosurgical lubricant composition of the invention.

DETAILED DESCRIPTION OF THE INVENTION

Figure 2:
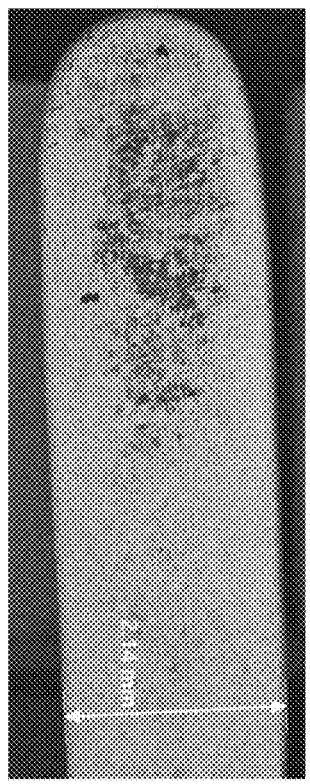
FIG. 2 is a chart including photographs showing electrosurgical blades after undergoing an electrode protection test on a control, an electrosurgical blade coated with soy lecithin and an electrosurgical blade coated with an electrosurgical lubricant composition of the invention.
Figure 2:
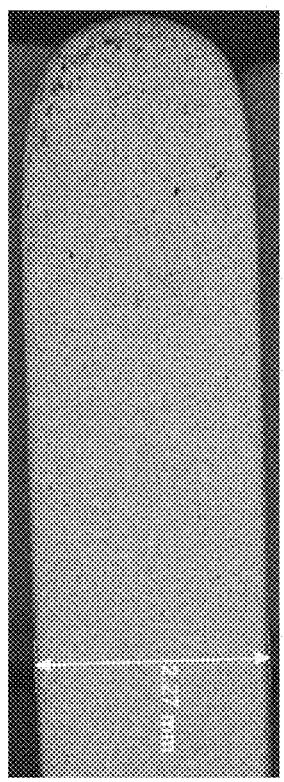
Figure 2:
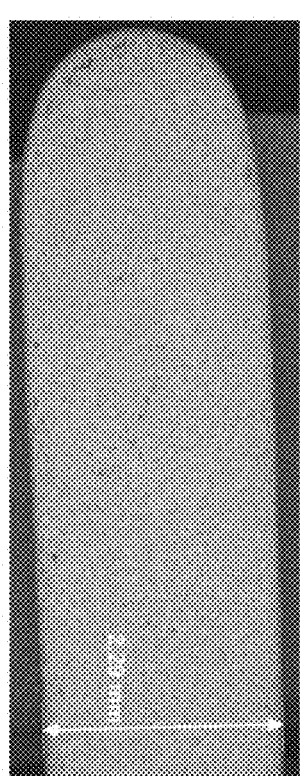

The present invention provides electrosurgical lubricants having the advantages described herein. Methods of using electrosurgical lubricants are disclosed. Sterilized kits for lubricating electrosurgical tools are also described herein along with methods for preparing the kits. In a preferred embodiment, compositions comprising a complex polyester polymer are used as the electrosurgical lubricants.

Electrosurgical Lubricant

Complex Polyester Polymer

In one preferred embodiment, the synthetic electrosurgical lubricant of the present invention relates to a complex polyester polymer that is generally derived from the reaction of three types of compounds, namely a) one or more monofunctional carboxylic acids, b) one or more polyfunctional carboxylic acids and c) one or more polyfunctional alcohols, wherein the lubricant has a viscosity of over 5,000 centipoises (5 Pa·s) to about 15,000 centipoises (15 Pa·s) as measured according to ASTM D7042.

Monofunctional Carboxylic Acid

The electrosurgical lubricant includes a complex polyester polymer that is derived from at least one monofunctional carboxylic acid. The monofunctional carboxylic acids utilized in the present invention comprise a single carboxylic acid group. The monofunctional carboxylic acids can be aliphatic or aromatic. The acids could also be linear or branched. The monofunctional carboxylic acids preferably contain a total of from about 4 to about 24 carbon atoms.

Examples of suitable monofunctional carboxylic acids include, but are not limited to, 2-methylpropanoic acid, benzoic acid, 2-ethylbuteric acid, hexanoic acid, heptanoic acid, 2-ethylhexanoic acid, octanoic acid, nonanoic acid, 3,5,5-trimethylhexanoic acid, isononanoic acid, decanoic acid, isooctadecanoic acid, dodecanoic acid, 2-methyl butyric acid, isopentanoic acid, pentanoic acid, 2-methyl pentanoic acid, 2-methyl hexanoic acid, isooctanoic acid, undecylinic acid, isolauric acid, isopalmitic acid, isostearic acid, and behenic acid, and derivatives and combinations thereof.

In a preferred embodiment, the monofunctional carboxylic acid comprises isooctadecanoic acid that has the formula:

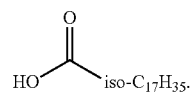

Polyfunctional Carboxylic Acid

The one or more polyfunctional carboxylic acids utilized to form the complex polyester polymer include at least two carboxylic acid groups. For the sake of clarity, it is to be understood that the polyfunctional carboxylic acids can include functional groups, including functionalized and non-functionalized dicarboxylic acids. The polyfunctional carboxylic acids can be aliphatic or aromatic. They can be linear or branched as well. Preferred polyfunctional carboxylic acids have 2 to about 12 carbon atoms with 4 to about 7 carbon atoms being preferred. Dicarboxylic acids are preferred in one embodiment.

Examples of suitable polyfunctional carboxylic acids include, but are not limited to, butanedioic acid, pentanedioic acid, hexanedioic acid, heptanedioic acid, octanedioic acid, nonanedioic acid, decanedioic acid, undecanedioic acid, dodecanedioic acid, carbonic acid, dimer acid, phthalic acid, isophthalic acid, terephthalic acid, and 2-6-naphthalene dicarboxylic acid, and derivates and combinations thereof.

In a preferred embodiment, the polyfunctional carboxylic acid comprises at least hexanedioic acid, which has the formula:

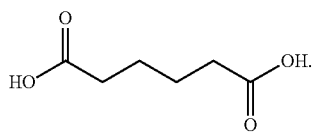

Polyfunctional Alcohol

The electrosurgical lubricant includes a polymer that is derived from at least one polyfunctional alcohol. The polyfunctional alcohol has two or more alcohol (—OH) groups and optionally includes one or more additional functional groups. The polyfunctional alcohols may be aliphatic or aromatic. The polyfunctional alcohol may be linear or branched, depending upon the type of electrosurgical lubricant to be formed. Preferred polyfunctional alcohols have 2 to about 10 carbon atoms.

Suitable polyfunctional alcohols include, but are not limited to, polyols such as diols, triols, tetraols, pentaols, hexaols, and the like. Specific polyfunctional alcohols include, but are not limited to, glycerol, pentaerythritol, dipentaerythrityl, tripentaerythritol, trimethylolpropane, neopentyl glycol, propylene glycol, 1,3-butylene glycol, 2-methyl-1,3-propanediol, dipropylene glycol, ethylene glycol, cyclohexanedimethanol, and butyl ethyl propanediol, and derivatives and combinations thereof.

In one embodiment, propane diol is preferred, and has the following formula:

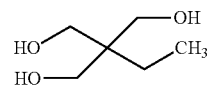

In a preferred embodiment, the complex polyester polymer has the following formula: $C_{18}H_{36}O_2 \cdot X (C_6H_{14}O_3 \cdot C_6H_{10}O_4)_Y$, wherein both X and Y can be varied to achieve the desired viscosity of the lubricant.

Complex polyester polymers suitable for use in the lubricant compositions of the invention are commercially available from sources such as Nyco America LLC of Newnan, Georgia and Zschimmer & Schwarz of Milledgeville, Georgia.

Methods for Preparing the Complex Polyester Polymer

The complex polyester polymer is formed in one embodiment by combining suitable amounts of at least one monofunctional carboxylic acid, at least one polyfunctional carboxylic acid and at least one polyfunctional alcohol and performing an esterification reaction thereon.

In one embodiment, the reactants are added to a suitable reactor in desired ratios and heated, preferably under agitation, under an inert gas, at a temperature of about 180° C. to about 230° C. One or more suitable catalysts can be utilized. Activated charcoal may be added in some embodiments as a catalyst support and/or absorbent.

After the reaction has proceeded to a desired degree of completion to form the complex polyester polymer, the reaction product is recovered via purification methods as known to those of ordinary skill in the art.

Other Optional Components

The lubricant compositions of the present invention may include one or more optional additives or components in order to contribute desirable properties to the composition. Examples of optional components include, but are not limited to, viscosity modifiers, surfactants, antioxidants, pigments, dyes, preservatives, non-stick components, fragrances, anti-inflammatories, scented components or the like.

In some embodiments, the lubricant compositions of the present invention include a viscosity modifier which can assist in adjusting the thickness of the compositions and thereby influence flowability of the compositions as well as the ability to stay in contact with the desired portion of an electrosurgical device. Examples of viscosity modifiers include, but are not limited to thickeners, such as but not limited to, xantham gum, guar gum, celluloses like hydroxyethyl cellulose and hydroxypropyl methyl cellulose, microcrylstaline celluloses, methacrylates, alginates, gelatins, starches, and pectin; and thinners such as but not limited to, hexylene/propylene glycol and alcohols.

In some embodiments, the lubricant compositions comprise a component that may promote or participate in the formation of a non-stick surface on the probe. In some embodiments, this component may be suspended in the lubricant composition. In some embodiments, the lubricant compositions comprise a salt of the formula: $M^1(R^1)(R^2)$ (calcium stearate) (II). In some embodiments, M 1 is a divalent cation. In some embodiments, $R^1$ and $R^2$ are independently —$OC(O)C_{10}$-$C_{26}$ alkyl, —$OC(O)C_{10}$-$C_{25}$ alkenyl, or —$OC(O)C_{10}$-$C_{26}$ alkynyl. In some embodiments, each hydrogen atom in $C_{10}$-$C_{26}$ alkyl, $C_{10}$-$C_{26}$ alkenyl, or $C_{10}$-$C_{26}$ alkynyl is independently optionally substituted with halo, hydroxy, amino, oxo, or $OR^3$. In some embodiments, $R^3$ is independently H, $C_1$-$C_6$ alkyl, $C_1$-$C_6$ alkenyl, $C_1$-$C_6$ alkynyl, $C_{10}$-$C_{26}$ alkyl, $C_{10}$-$C_{26}$ alkenyl, $C_{10}$-$C_{26}$ alkynyl, —$C(O)C_1$-$C_6$ alkyl, —$C(O)C_1$-$C_6$ alkenyl, —$C(O)C_1$-$C_6$ alkynyl, —$C(O)C_{10}$-$C_{26}$ alkyl, —$C(O)C_{10}$-$C_{26}$ alkenyl, —$C(O)C_{10}$-$C_{25}$ alkynyl, and wherein each hydrogen atom in $C_1$-$C_6$ alkyl, $C_1$-$C_6$ alkenyl, $C_1$-$C_6$ alkynyl, $C_{10}$-$C_{26}$ alkyl, $C_{10}$-$C_{26}$ alkenyl, $C_{10}$-$C_{26}$ alkynyl, —$C(O)C_1$-$C_6$ alkyl, —$C(O)C_1$-$C_6$ alkenyl, —$C(O)C_1$-$C_6$ alkynyl, —$C(O)C_{10}$-$C_{26}$ alkyl, —$C(O)C_{10}$-$C_{26}$ alkenyl, —$C(O)C_{10}$-$C_{26}$ alkynyl is independently optionally substituted with halo, hydroxy, or amino. In some embodiments, the divalent cation is magnesium, calcium, or iron. In some embodiments, the salt of formula II comprises a stearate. In some embodiments, the salt of formula II is calcium stearate.

In some embodiments, $M^1$ is a monovalent cation and is associated with only one of $R^1$ or $R^2$. In some embodiments, the lubricant compositions comprise a stearate. In some embodiments, the lubricant compositions comprise sodium stearate.

In some embodiments, the lubricant compositions comprise a fragrance. In some embodiments, the fragrance comprises an essential oil. In some embodiments, the essential oil is mace essential oil.

The lubricant compositions may comprise a certain percentage by weight of the fragrance. In some embodiments, the fragrance is at least about 1%, at least about 3%, at least about 5%, or at least about 10% by weight of the lubricant compositions. In some embodiments, the fragrance is up to about 25%, up to about 20%, or up to about 15% by weight of the lubricant compositions. The fragrance may be about 2%, about 3%, about 4%, about 5%, about 6%, about 7%, about 7.5%, about 8%, about 9%, about 10%, about 12%, about 15%, about 20%, or about 25% by weight of the lubricant compositions. The fragrance may be about 2% to about 25%, about 2% to about 20%, about 2% to about 15%, about 3% to about 12%, or about 5% to about 12% by weight of the lubricant compositions.

In some embodiments, the lubricant compositions comprise at least one antioxidant. The antioxidant may provide protection for the fatty components against heat-degradation. In addition, the antioxidant may act as a preservative and may assist the body's healing processes. In some embodiments, the at least one antioxidant comprises a tocopherol or a lipoic acid. In some embodiments, the antioxidant comprises a blend of tocopherols. In some embodiments, the lipoic acid is an alpha-lipoic acid.

The lubricant compositions may comprise a certain percentage by weight of the at least one antioxidant. In some embodiments, the at least one antioxidant is at least about 1% or at least about 3% by weight of the lubricant compositions. In some embodiments, the at least one antioxidant is up to about 20%, up to about 15%, or up to about 10% by weight of the lubricant compositions. The at least one antioxidant may be about 1%, about 2%, about 3%, about 4%, about 5%, about 6%, about 7%, about 7.5%, about 8%, about 9%, about 10%, about 12%, about 15%, or about 20% by weight of the lubricant compositions. The at least one antioxidant may be about 1% to about 20%, about 1% to about 15%, about 1% to about 10%, or about 2% to about 8% by weight of the lubricant compositions.

In some embodiments, the lubricant compositions comprise at least one anti-inflammatory. In some embodiments, the at least one anti-inflammatory comprises a caryophyllene or a phyto-aromatic. In some embodiments, the phyto-aromatic comprises a terpene.

The lubricant compositions may comprise a certain percentage by weight of the at least one anti-inflammatory. In some embodiments, the at least one anti-inflammatory is at least about 1% or at least 2% by weight of the lubricant compositions. In some embodiments, the at least one anti-inflammatory is up to about 20%, up to about 15%, or up to about 10% by weight of the lubricant compositions. The at least one anti-inflammatory may be about 1%, about 2%, about 3%, about 4%, about 5%, about 6%, about 7%, about 7.5%, about 8%, about 9%, about 10%, about 12%, about 15%, or about 20% by weight of the lubricant compositions. The at least one anti-inflammatory may be about 1% to about 20%, about 1% to about 15%, about 1% to about 10%, or about 2% to about 8% by weight of the lubricant compositions.

In some embodiments, the lubricant compositions may comprise a scented component. In some embodiments, the scented component is a fragrance oil. In some embodiments, the scented component is biocompatible. In some embodiments, the scented component is selected from the group consisting of hexyl acetate, fructone, ethyl methylphenylglycidate, and combinations thereof. In some embodiments, the scented component is hexyl acetate. In some embodiments, the scented component is fructone. In some embodiments, the scented component is ethyl methylphenylglycidate. In some embodiments, the scented component comprises a lactone. Additional disclosure related to scented components can be found in U.S. Application Publication No. 2017/049938, which is herein expressly incorporated by reference in its entirety.

Viscosity

In an important aspect of the present invention, the electrosurgical lubricant has a sufficiently high viscosity to allow desirable coating of an electrosurgical device and stability once the lubricant is placed thereon, such that the lubricant does not appreciably drip or otherwise run off the device. Therefore, in one embodiment of the invention, the lubricant including the complex polyol polyester polymer has a viscosity that ranges from greater than 5,000 centipoises (5 Pa·s) to about 15,000 centipoises (15 Pa·s), desirably from about 6,000 centipoises (6 Pa·s) to about 12,000 centipoises (12 Pa·s) and preferably from about 8,000 centipoises (8 Pa·s) to 11,000 centipoises (11 Pa·s) at 25° C. as measured according to ASTM D7042.

Viscosity of the lubricant can be controlled in one embodiment by tailoring the molecular weight of the polymer, wherein higher molecular weight polymers generally provide higher viscosity. Still further, viscosity can be adjusted by including other optional viscosity modifying components in the lubricant, as mentioned above.

Molecular Weight

Gel Permeation Chromatography (GPC) was used to determine the molecular weight distribution of an example polymer of a synthetic electrosurgical lubricant composition. The GPC study was conducted by dissolving 10 mg of the electrosurgical lubricant composition polymer into 10 g of chloroform. The solution was prepared and analyzed in duplicate along with a series of narrow molecular weight polystyrene standards. The GPC analysis conditions were as follows:

| | |
|---|---|
| Columns | PLgel 50 Å, $10^3$ Å, $10^4$ Å |
| Eluent (Solvent) | Chloroform |
| Eluent Flow Rate | 1 mL/min |
| Column/Detector Temperature | 35° C. |
| Sample Loop Size | 100 µL |

GPC revealed that the electrosurgical lubricant composition polymer had a multimodal distribution. More specifically, five individual distribution peaks were discovered for the tested composition. Not wishing to be bound by theory, it is believed that the multimodal distribution arises due to branching of chains and/or termination events that do not occur at the same time for all chains.

The first distribution peak was 5-20% of the total weight of the electrosurgical lubricant composition polymer and ranged in weight average molecular weight (Mw) from generally 25,000 to 400,000, desirably from 50,000 to 300,000 and preferably from 100,000 to 200,000.

The second distribution peak was 50-65% of the total weight of the electrosurgical lubricant composition polymer and ranged in weight average molecular weight (Mw) from generally 2,000 to 40,000, desirably from 5,000-30,0000, and preferably from 8,000-22,000.

The third distribution peak was 3-18% of the total weight of the electrosurgical lubricant composition polymer and ranged in weight average molecular weight (Mw) generally from 500 to 7,000, desirably from 1,000-5,500, and preferably from 1,500-3,500.

The fourth distribution peak was 9-24% of the total weight of the electrosurgical lubricant composition polymer and ranged in weight average molecular weight (Mw) generally from 100 to 7,000, desirably from 500-5,000, and preferably from 1,000-3,000.

The fifth distribution peak was 1-16% of the total weight of the electrosurgical lubricant composition polymer and ranged in weight average molecular weight (Mw) generally from 50 to 1,000, desirably from 100-700, and preferably from 200-500.

Other Attributes

The electrosurgical lubricants of the present invention, as noted above include one or more and preferably all of the following desirable properties: lack of or low impedance of current of the electrosurgical device, ease of removal from the electrosurgical device and minimal sticking of electrosurgical device to tissue. The lubricants also exhibit a relatively high flash point and therefore are heat stable at temperatures greater than 175° C., 200° C., 250° C., or 550° F. (288° C.). The lubricants also have a low odor, even with aging. Still further, the electrosurgical lubricants of the invention considerably reduce the amount of eschar that builds up on electrosurgical devices, in comparison to prior art lubricants such as soy lecithin.

In preferred embodiments, the electrosurgical lubricant is free of proteins. As known to those of ordinary skill in the art, proteins may cause allergic reactions in some patients.

Sterility

In an important aspect of the present invention, the electrosurgical lubricants are sterile compositions. Sterility is very important in order not to introduce pathogens into the sterile surgical field. In one embodiment the electrosurgical lubricants are rendered sterile through the use of radiation. Ionizing radiation can be utilized, which utilizes short wavelength, high intensity radiation to destroy microorganisms. Examples include x-ray and gamma rays, with x-rays being preferred in one embodiment.

The dosage of radiation applied can vary depending upon the composition of the electrosurgical lubricant. The radiation amount should be sufficient to kill bio-based organisms. In various embodiments, radiation dosages between 20 and 55 kGy are utilized in order to provide sterility.

Stability

Importantly, no appreciable change in viscosity was noted when electrosurgical lubricants of the present invention were irradiated in order to render the composition sterile. One embodiment of an electrosurgical lubricant was found to have a stability of at least one year, when irradiated with a dose of 51.1 to 54.9 kGy with respect to one or more properties of homogeneity, color, clarity and viscosity. In a preferred embodiment, the surgical lubricant is stable with respect to all four parameters.

Electrosurgical Tool Lubricating Kit

In a further important aspect of the present invention, a kit is provided for lubricating electrosurgical tools, with the kit comprising a sealed package, comprising therein a sealed container including an electrosurgical lubricant according to the present invention. An applicator is also contained within the sealed package that can be utilized to apply the electrosurgical lubricant to the electrosurgical tool.

The sealed container can be any suitable vessel that can suitably house and transport the electrosurgical lubricant therein to the point of use. In a preferred embodiment, the container is able to withstand the radiation doses described herein. Suitable containers include, but are not limited to, a jar, a bottle, a tube, a bag, a pouch, a vial, a flask or the like, which are sealed as appropriate for the container type. For example, jars, bottles, tubes, vials, and flasks can be sealed with lids, caps or the like. Bags, pouches, etc. can be self-sealed or sealed with a further component such as a valve, as desired by the manufacturer to provide ease of use for the end user. Depending upon needs of the user, the container can be hard, e.g. glass or rigid polymer, or flexible, e.g. polymeric or elastomeric in order to assist in application or use.

Suitable applicators include those mentioned above, for example, but not limited to a sponge, wipe, brush or cloth.

The sealed container, the electrosurgical lubricant and the applicator can be transported in a sealed package having a size sufficient to house the sealed container and applicator therein.

In some embodiments of a sealed container, a tray is utilized, with the tray having a removable seal such as plastic wrap.

In a preferred embodiment, the sealed package is a blister pouch, having a polymer film face, such as nylon with a flexible paper backing.

In a preferred embodiment, the kit for lubricating electrosurgical tools is sterilized. The same method for sterilization described above can be utilized and is herein incorporated by reference. When the kit is irradiated, all contents within the sealed package are rendered sterile and suitable for use in a desired surgical field.

In a preferred embodiment, the electrosurgical lubricant is packaged in a polymeric bottle having a screw cap closure. In some embodiments when solid containers are utilized, the fill level ranges from 20 to 70, 30 to 60 or 40 to 60 percent, which allows enough extra volume so that an electrosurgical device can be dipped into the bottle and not spill the contents, namely the electrosurgical lubricant.

Methods of Using the Lubricants

One method for lubricating an electrosurgical device comprises the steps of obtaining the electrosurgical device and applying the lubricant comprising the complex polyester polymer to a surface thereof.

The lubricant can be applied by direct application by dipping the electrosurgical device directly into a container containing the lubricant.

The lubricant can alternatively be applied by indirect application where the lubricant is first applied to an applicator such as a sponge, wipe, brush or cloth. Thereafter, the applicator is used to apply the lubricant, such as by wiping, brushing, or the like, onto the electrosurgical device. The lubricant should be applied such that it evenly coats all surfaces of the electrosurgical device adapted to come into contact with a patient.

In a preferred embodiment, the applicator is radiopaque such that the applicator can be seen utilizing a standard medical Radiographic equipment.

The lubricant can be reapplied to the device during a surgical procedure, if necessary.

EXAMPLES

In the following tests, an electrosurgical lubricant composition according to the present invention was utilized and comprised a polymer derived from a reaction product of at least one monofunctional carboxylic acid, at least one polyfunctional carboxylic acid and at least one polyfunctional alcohol, wherein the composition had a viscosity between 6,000 and 15,000 centipoises (6 Pa·s-15 Pa·s).

Coating Ability Test

The ability of an electrosurgical lubricant to completely coat an electrode without excessive dripping is a function of the product's viscosity and rheology.

The ability of an example electrosurgical lubricant composition to coat a flat electrode without excessive dripping was evaluated by dipping a flat blade electrode into the 10 mL bottle containing 4 mL of the lubricant. The electrode was visually inspected for completeness of the coating. Additionally, the electrode was held at a 45° angle for 2 min and the number of drips to occur over the time period was documented for both an example electrosurgical lubricant composition and a soy lecithin lubricant.

The test established that although both lubricants yielded 100% coating of the electrosurgical device, the soy lecithin lubricant showed, on average, more drips (3.1 drips) than the example electrosurgical lubricant (2.4 drips) over the 2 min test period. This result was found to be statistically significant and indicates better performance by the example electrosurgical lubricant.

The coating ability test was repeated after accelerated storage for 92 days at 60° C. in order to mimic aged material. After accelerated aging, both the electrosurgical lubricant composition and soy lecithin lubricant yielded 100% coating of the electrosurgical device. The soy lecithin lubricant showed, on average, more drips (2.6 drips) than the electrosurgical lubricant composition (1.7 drips) over the two-minute test period. This result was also found to be statistically significant.

Cutting Force Test

It is important that an electrosurgical lubricant not impede the flow of electrical current during use. This presence of current impedance can be indirectly observed by measuring the required cutting force needed to insert an electrosurgical blade into a substrate. The cutting force required for a flat blade electrode can be measured by cutting a substrate placed on a top loading balance and measuring the force gravimetrically in grams.

A study was conducted with uncoated electrodes, commercially available electrodes coated in polytetrafluoroethylene (PTFE), electrodes coated in soy lecithin and electrodes coated in the example electrosurgical lubricant. The electrodes were vertically inserted into chicken tissue to a predetermined depth as a set energy profile was delivered (30 watts power setting under cut mode frequency). The downward force required to cut to the predetermined depth was measured in grams.

The cutting force required for an uncoated electrode was found to be 139.7 g. The PTFE coated electrode had a required cutting force of 90.8 g and the electrode coated in soy lecithin required 72.3 g. Finally, the electrode coated in the example electrosurgical lubricant required only 39.4 g. These results indicate that none of the coating conditions impede the delivery of electrical current. Further, the example electrosurgical lubricant lowered the required cutting force more than any of the other coating conditions, indicating better performance as an electrosurgical lubricant.

The cutting force test was repeated after accelerated storage for 92 days at 60° C. in order to mimic aged material. When aged material was tested, it was found that flat blade electrodes coated with soy lecithin required on average 89.9 g of downward force, while the example electrosurgical lubricant only required 50.5 g. This demonstrates that even under aged conditions, the example electrosurgical lubricant outperforms soy lecithin.

Electrode Adherence to Tissue Test

Electrodes that stick or adhere to tissue during cutting can damage the surrounding tissue and increase bleeding at the surgical site. As such, it is important that an electrosurgical lubricant lessen the adherence of the electrode to tissue.

The ability to prevent the adherence of an electrode to tissue was evaluated gravimetrically by placing a chicken substrate on a top loading balance. The electrodes were each applied to the chicken tissue and upon completion of the "burn", the electrode was allowed to remain in contact with the tissue for 2 seconds before being lifted from the tissue. The change in weight as the electrode was pulled away from the tissue was measured. In cases where there was high adhesion, large negative changes in weight occurred as the chicken tissue was lifted off the balance surface.

The study was conducted with ball electrodes that were either uncoated, coated in soy lecithin, or coated in the example lubricant. The uncoated electrode showed the most adhesion with an average weight change of −110.0 g and soy lecithin showed less adhesion than the uncoated electrode with an average weight change of −66.1 g. The example lubricant demonstrated the least tissue adhesion and thus best performance as an electrosurgical lubricant with an average weight change of only −32.6 g.

Eschar Test

The eschar that develops on electrosurgical blades during electrosurgical procedures can hinder the performance of the blade and must be periodically cleaned from the blade to prevent its build up. As such, it is important that an electrosurgical lubricant not only ease the removal of eschar but also reduce the amount of eschar that accumulates on the blade with each cut.

The build-up of eschar and subsequent ease of eschar removal was determined using uncoated electrosurgical blades, blades coated in soy lecithin, and blades coated in the example electrosurgical lubricant. This evaluation was conducted using the electrosurgical unit at 50 watts (max power setting) and performing sufficient burns in coagulation mode to build-up appreciable eschar on the uncoated electrodes. The same number of burns was then used with the electrodes under the two coating conditions. After the burns, the blades were wiped five times with a dry Kimwipe® to determine how much of the eschar build up could be easily removed.

The results of the study are shown in FIG. 1. The study indicated that after 4 burns, the uncoated condition had the most eschar build up with some tissue still remaining adhered to the electrode after the wipes. The soy lecithin coated electrodes built up less eschar, but retained a thin burnt layer on the electrodes after the 5 wipes. The electrodes coated in the example electrosurgical lubricant showed the least amount of eschar build up over the four burns and were restored to clean metal by the 5 wipes.

Flashpoint

Electrodes during electrosurgical procedures can become very hot due to the flow of electrical current. As such, it is important that an electrosurgical lubricant have a high flashpoint to ensure its safe use during electrosurgical procedures.

The flashpoint of soy lecithin was 150° C. whereas the example electrosurgical lubricant composition had a flashpoint of 290° C., as determined by Cleveland Open Cup (COC, ASTM D 92).

Odor Evaluation

The odor evaluation was performed by a panel of randomly selected test participants. The panel assessed the odor of the example electrosurgical lubricant composition and soy lecithin. The odor of each product was evaluated on a scale of 1-5, with 1 being no malodor and 5 being the presence of a strong malodor.

The odor profile of the example electrosurgical lubricant composition was rated more favorably by the panel than soy lecithin.

The odor evaluation test was repeated after accelerated storage for 92 days at 60° C. in order to mimic aged material. The panelists again rated the odor profile of the example electrosurgical lubricant more favorably than the soy lecithin lubricant, with a wider margin between the favorability of the two older profiles than was observed in the initial test with unaged material.

Electrode Protection

The instruments used during electrosurgical procedures can be damaged during the procedure and by the aggressive reprocessing steps that are typically required to remove burnt on eschar from reusable electrosurgical devices. The use of an effective electrosurgical lubricant can help to reduce the damage the devices incur over time.

Uncoated electrosurgical blades, blades that had been coated with soy lecithin, and blades that had been coated in the example electrosurgical lubricant composition were used 10 times and then examined using a Scanning Electron Microscope (SEM) to determine the level of damage incurred by the flat blade electrodes. The black markings in the FIG. 2 indicate the presence of damage.

It can be seen in FIG. 2 that the uncoated blade has the most damage and the blade coated in the example electrosurgical lubricant exhibits the least amount of damage.

Electrosurgical Lubricating Kit Example 4 mL of the example electrosurgical lubricant composition described above was packaged in a 10 mL bottle provided with a removable screw cap closure. The filling rate of approximately 40% allowed extra volume so the electrosurgical device blade could be dipped into the bottle and not spill the contents. The bottle was packaged with a radiopaque surgical sponge with adhesive backing so that an end user would have the option to wipe the lubricant onto devices instead of dip coating them. The bottle and sponge were sealed in a blister pouch with a nylon film face and flexible paper backing.

Irradiation Stability

To test the physical stability of the example electrosurgical lubricant composition to applied radiation, the packaged material was subjected to x-ray radiation at a dose of 51.1 to 54.9 kGy. The resulting irradiated electrosurgical lubricant composition was then stored at accelerated conditions, namely 40° C. at 75% relative humidity, for a period of six months to further force degradation. The irradiated electrosurgical lubricant composition was tested at an initial time point, and then again after one month and six months of storage to assess the lubricant's homogeneity, color, clarity, viscosity and packaging appearance.

The example lubricant composition was found to be stable under the relatively high dose of irradiation, >50 kGy for all tested parameters.

For the avoidance of doubt, the compositions and methods of the present invention encompass all possible combinations of the components, including various ranges of said components, disclosed herein. It is further noted that the term 'comprising' does not exclude the presence of other elements. However, it is also to be understood that a description of a product comprising certain components also discloses a product consisting of these components. Similarly, it is also to be understood that a description on a process comprising certain steps also discloses a process consisting of these steps.

While in accordance with the patent statues, the best mode and preferred embodiment have been set forth, the scope of the invention is not limited thereto, but rather by the scope of the attached claims.

What is claimed is:

1. An electrosurgical lubricant, comprising: a polymer derived from a reaction product of at least one monofunctional carboxylic acid, at least one polyfunctional carboxylic acid and at least one polyfunctional alcohol only having 2 hydroxyl groups, wherein the lubricant has a viscosity from about 6,000 centipoises (6 Pa·s) to about 15,000 centipoises (15 Pas) at 25° C. as measured according to ASTM D7042-21a.

2. The lubricant according to claim 1, wherein the monofunctional carboxylic acid has from about 4 to about 24 carbon atoms, wherein the polyfunctional carboxylic acid has 2 to about 12 carbon atoms.

3. The lubricant according to claim 2, wherein the monofunctional carboxylic acid is one or more of 2-methylpropanoic acid, benzoic acid, 2-ethylbutyric acid, hexanoic acid, heptanoic acid, 2-ethylhexanoic acid, octanoic acid, nonanoic acid, 3,5,5-trimethylhexanoic acid, isononanoic acid, decanoic acid, isooctadecanoic acid, dodecanoic acid, 2-methyl butyric acid, isopentanoic acid, pentanoic acid, 2-methyl pentanoic acid, 2-methyl hexanoic acid, isooctanoic acid, undecylinic acid, isolauric acid, isopalmitic acid, isostearic acid, and behenic acid, wherein the polyfunctional carboxylic acid is one or more of butanedioic acid, pentanedioic acid, hexanedioic acid, heptanedioic acid, octanedioic acid, nonanedioic acid, decanedioic acid, undecanedioic acid, dodecanedioic acid, carbonic acid, dimer acid, phthalic acid, isophthalic acid, terephthalic acid, and 2-6-naphthalene dicarboxylic acid, and wherein the polyfunctional alcohol is one or more of neopentyl glycol, propylene glycol, 1,3-butylene glycol, 2-methyl-1,3-propanediol, dipropylene glycol, ethylene glycol, and butyl ethyl propanediol.

4. The lubricant according to claim 3, wherein the monofunctional carboxylic acid comprises isooctodecanoic acid, wherein the polyfunctional carboxylic acid comprises hexanedioic acid, and wherein the polyfunctional alcohol comprises propanediol.

5. The lubricant according to claim 4, wherein the composition further includes one or more of a viscosity modifier, a surfactant, an antioxidant, a pigment, a dye, a preservative, a non-stick component, a fragrance, a scented component and an anti-inflammatory.

6. The lubricant according to claim 1, wherein the viscosity ranges from 6,000 centipoises (6 Pa·s) to 12,000 centipoises (12 Pa·s) as measured according to ASTM D7042-21a.

7. The lubricant according to claim 1, wherein the viscosity ranges from 8,000 centipoises (8 Pa·s) to 11,000 (11 Pa's) centipoises as measured according to ASTM D7042-21a.

8. The lubricant according to claim 1, wherein the lubricant has a flash point greater than 175° C., wherein the electrosurgical lubricant is free of proteins, and wherein the electrosurgical lubricant is sterile.

9. An electrosurgical lubricant, comprising:
a polymer derived from a reaction product of at least one monofunctional carboxylic acid, at least one polyfunctional carboxylic acid and at least one polyfunctional alcohol, wherein the lubricant has a viscosity above 5,000 centipoises (5 Pa·s) to about 15,000 centipoises (15 Pas) at 25° C. as measured according to ASTM D7042-21a,
wherein the polymer has a multimodal distribution with a first distribution peak comprising 5 to 20 percent of the total weight of the polymer and having a weight average molecular weight from 25,000 to 400,000, a second distribution peak comprising 55 to 60 percent of the total weight of the polymer and having a weight average molecular weight from 2,000 to 40,000, a third distribution peak comprising 3 to 18 percent of the total weight of the polymer and having a weight average molecular weight from 500 to 7,000, a fourth distribution peak comprising 9 to 24 percent of the total weight of the polymer and having a weight average molecular weight from 100 to 7,000 and a fifth distribution peak comprising 1 to 16 percent of the total weight of the polymer and having a weight average molecular weight from 50 to 1,000.

10. A method for lubricating an electrosurgical device, comprising the steps of:
obtaining the electrosurgical device; and
applying an electrosurgical lubricant to at least a portion of the electrosurgical device,
wherein the electrosurgical lubricant comprises: a polymer derived from a reaction product of at least one monofunctional carboxylic acid, at least one polyfunctional carboxylic acid and at least one polyfunctional alcohol, wherein the lubricant has a viscosity above 5,000 centipoises (5 Pa·s) to about 15,000 centipoises (15 Pa·s) at 25° C. as measured according to ASTM D7042-21a.

11. A method for lubricating an electrosurgical device, comprising the steps of:
obtaining the electrosurgical device; and
applying the electrosurgical lubricant according to claim 3 to the at least a portion of the electrosurgical device.

12. A kit for lubricating electrosurgical tools, comprising:
a sealed package, comprising therein:
a sealed container including an electrosurgical lubricant comprising: a polymer derived from a reaction product of at least one monofunctional carboxylic acid, at least one polyfunctional carboxylic acid and at least one polyfunctional alcohol, wherein the lubricant has a viscosity above 5,000 centipoises (5 Pa·s) to about 15,000 centipoises (15 Pa·s) at 25° C. as measured according to ASTM D7042-21a; and
an applicator that can be utilized to apply the electrosurgical lubricant to an electrosurgical tool,
wherein the sealed container, electrosurgical lubricant and applicator are sterile.

13. The kit according to claim 12, wherein the monofunctional carboxylic acid has from about 4 to about 24 carbon atoms, wherein the polyfunctional carboxylic acid has 2 to about 12 carbon atoms, and wherein the polyfunctional alcohol has 2 to about 10 carbon atoms.

14. The kit according to claim 13, wherein the monofunctional carboxylic acid has from about 4 to about 24 carbon atoms, wherein the polyfunctional carboxylic acid has 2 to about 12 carbon atoms, and wherein the polyfunctional alcohol has 2 to about 10 carbon atoms, and wherein the monofunctional carboxylic acid is one or more of 2-methylpropanoic acid, benzoic acid, 2-ethylbutyric acid, hexanoic acid, heptanoic acid, 2-ethylhexanoic acid, octanoic acid, nonanoic acid, 3,5,5-trimethylhexanoic acid, isononanoic acid, decanoic acid, isooctadecanoic acid, dodecanoic acid, 2-methyl butyric acid, isopentanoic acid, pentanoic acid, 2-methyl pentanoic acid, 2-methyl hexanoic acid, isooctanoic acid, undecylinic acid, isolauric acid, isopalmitic acid, isostearic acid, and behenic acid, wherein the polyfunctional carboxylic acid is one or more of butanedioic acid, pentanedioic acid, hexanedioic acid, heptanedioic acid, octanedioic acid, nonanedioic acid, decanedioic acid, undecanedioic acid, dodecanedioic acid, carbonic acid, dimer acid, phthalic acid, isophthalic acid, terephthalic acid, and 2-6-naphthalene dicarboxylic acid, and wherein the polyfunctional alcohol is one or more of glycerol, pentaerythritol, dipentaerythrityl, tripentaerythritol, trimethylolpropane, neopentyl glycol, propylene glycol, 1,3-butylene glycol, 2-methyl-1,3-propanediol, dipropylene glycol, ethylene glycol, cyclohexanedimethanol, and butyl ethyl propanediol.

15. The kit according to claim 14, wherein the sealed container includes a jar, a bottle, a tube, a bag, a pouch, a vial, or a flask, and wherein the applicator is one or more of a sponge, wipe, brush and cloth.

16. The kit according to claim 15, wherein the viscosity ranges from 6,000 centipoises (6 Pa·s) to 12,000 centipoises (12 Pa·s) as measured according to ASTM D7042-21a.

17. The kit according to claim 15, wherein the sterilization is provided by subjecting the sealed package to a radiation dose between 20 and 55 kGy.

18. A method for preparing a kit for lubricating electrosurgical tools, comprising the steps of:
adding an electrosurgical lubricant to a container;
sealing the container;
placing the sealed container and an applicator in a package;
sealing the package with the sealed container and applicator therein; and
subjecting the sealed package to doses of radiation between 20 and 55 kGy thereby sterilizing the sealed package, the sealed container with electrosurgical lubricant therein, and the applicator, wherein the electrosurgical lubricant comprises: a polymer derived from a reaction product of at least one monofunctional carboxylic acid, at least one polyfunctional carboxylic acid and at least one polyfunctional alcohol, wherein the lubricant has a viscosity above 5,000 centipoises (5 Pa·s) to about 15,000 centipoises (15 Pa·s) at 25° C. as measured according to ASTM D7042-21a.

19. The method according to claim 18, wherein the sealed package is subjected to gamma rays or x-rays.

20. The method according to 19, wherein the monofunctional carboxylic acid has from about 4 to about 24 carbon atoms, wherein the polyfunctional carboxylic acid has 2 to about 12 carbon atoms, and wherein the polyfunctional alcohol has 2 to about 10 carbon atoms, and wherein the sealed container includes a jar, a bottle, a tube, a bag, a pouch, a vial, or a flask, and wherein the applicator is one or more of a sponge, wipe, brush and cloth.

\* \* \* \* \*

UNITED STATES PATENT AND TRADEMARK OFFICE
CERTIFICATE OF CORRECTION

PATENT NO. : 12,312,553 B2
APPLICATION NO. : 18/494192
DATED : May 27, 2025
INVENTOR(S) : Jessica Sue Haney Boester Linder Page 1 of 1

It is certified that error appears in the above-identified patent and that said Letters Patent is hereby corrected as shown below:

In the Claims

In Claim 1, Column 14, Line 45, replace "(15 Pas)" with --(15 Pa·s)--.

In Claim 7, Column 15, Lines 19-20, replace "(11 Pa's)" with --(11 Pa·s)--.

In Claim 9, Column 15, Line 32, replace "(15 Pas)" with --(15 Pa·s)--.

Signed and Sealed this
Eighteenth Day of November, 2025

John A. Squires
*Director of the United States Patent and Trademark Office*